(12) United States Patent
Honma et al.

(10) Patent No.: US 9,487,214 B2
(45) Date of Patent: Nov. 8, 2016

(54) TRANSMISSION CONTROL DEVICE FOR CONTINUOUSLY VARIABLE TRANSMISSION

(71) Applicant: JATCO Ltd, Fuji-shi, Shizuoka (JP)

(72) Inventors: Tomoaki Honma, Isehara (JP); Takahiro Kobayashi, Isehara (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 14/910,390

(22) PCT Filed: Aug. 1, 2014

(86) PCT No.: PCT/JP2014/070296
§ 371 (c)(1),
(2) Date: Feb. 5, 2016

(87) PCT Pub. No.: WO2015/019946
PCT Pub. Date: Feb. 12, 2015

(65) Prior Publication Data
US 2016/0185353 A1  Jun. 30, 2016

(30) Foreign Application Priority Data
Aug. 8, 2013  (JP) .................................. 2013-165601

(51) Int. Cl.
*B60W 10/06*  (2006.01)
*B60W 10/101*  (2012.01)
(Continued)

(52) U.S. Cl.
CPC .............. *B60W 30/19* (2013.01); *B60W 10/04* (2013.01); *B60W 10/06* (2013.01); *B60W 10/101* (2013.01); *B60W 10/107* (2013.01); *B60W 30/182* (2013.01); *F16H 61/04* (2013.01); *F16H 61/662* (2013.01); *F16H 61/66259* (2013.01); *F16H 63/50* (2013.01); *B60W 2510/104* (2013.01); *B60W 2540/16* (2013.01); *B60W 2710/0666* (2013.01); *B60W 2710/1005* (2013.01); *F16H 2061/6615* (2013.01)

(58) Field of Classification Search
None
See application file for complete search history.

(56) References Cited

U.S. PATENT DOCUMENTS 5,976,054 A * 11/1999 Yasuoka ............... B60W 10/06
                                                                  477/109
6,086,506 A    7/2000 Petersmann et al.
(Continued)

FOREIGN PATENT DOCUMENTS

EP          1 529 988 A2   5/2005
JP          2010-007749 A  1/2010

*Primary Examiner* — Edwin A Young
(74) *Attorney, Agent, or Firm* — Foley & Lardner LLP

(57) ABSTRACT

First control unit performing first pseudo stepwise up-shift control that, in first travelling mode, increases vehicle speed while performing hold of transmission ratio and up-shift by first shifting speed and reduces engine torque upon up-shift, second control unit performing second pseudo stepwise up-shift control that, in second travelling mode, increases vehicle speed while performing hold of transmission ratio and up-shift by second shifting speed and reduces engine torque upon up-shift, and third control unit controlling change of travelling mode and switch between two pseudo stepwise up-shift controls according to control states of first and second control units, are provided. When travelling mode is changed to second travelling mode during progress of up-shift in first pseudo stepwise up-shift control, third control unit maintains first pseudo stepwise up-shift control until up-shift is completed. With this, harmonization between pseudo stepwise up-shift control and engine torque control is secured, then shift shock is suppressed.

4 Claims, 6 Drawing Sheets

(51) Int. Cl.
*B60W 30/19* (2012.01)
*B60W 10/04* (2006.01)
*B60W 10/107* (2012.01)
*B60W 30/182* (2012.01)
*F16H 61/04* (2006.01)
*F16H 61/662* (2006.01)
*F16H 63/50* (2006.01)
*F16H 61/66* (2006.01)

(56) References Cited

U.S. PATENT DOCUMENTS

2002/0019692 A1\* 2/2002 Yasuoka ............... B60W 10/06
 701/55
2011/0015833 A1\* 1/2011 Urata .................... F16H 37/022
 701/51

\* cited by examiner

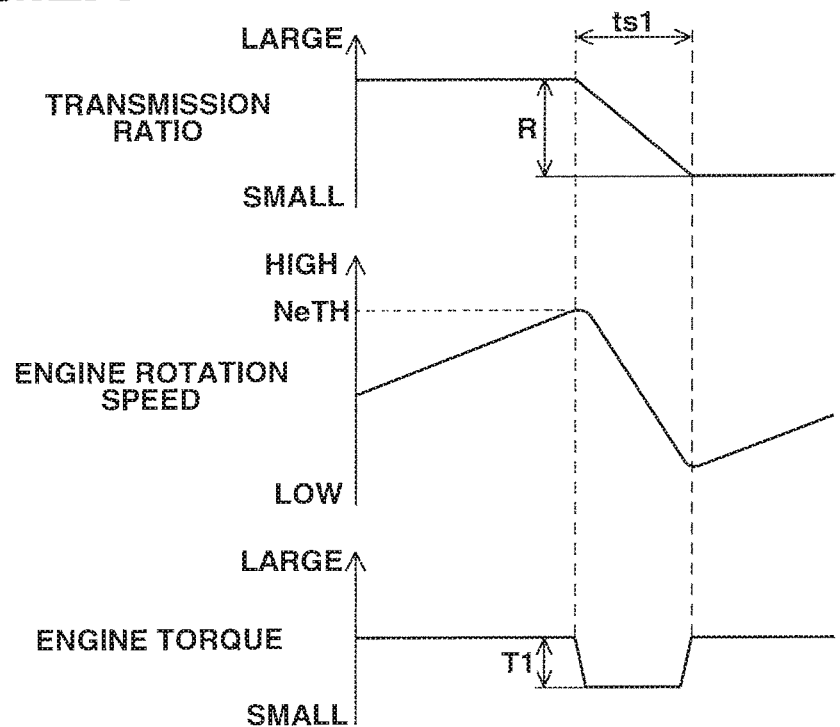
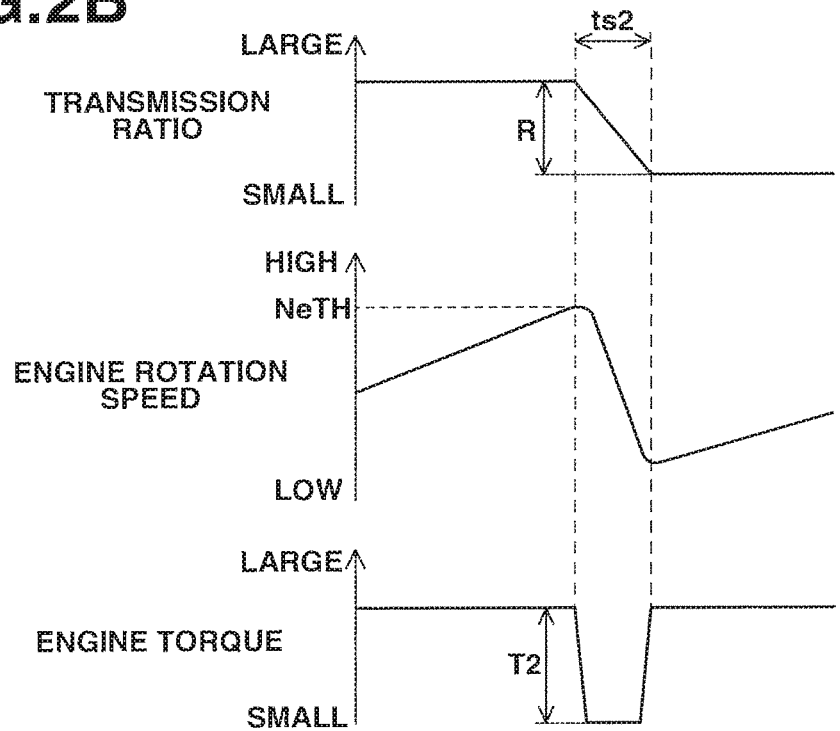

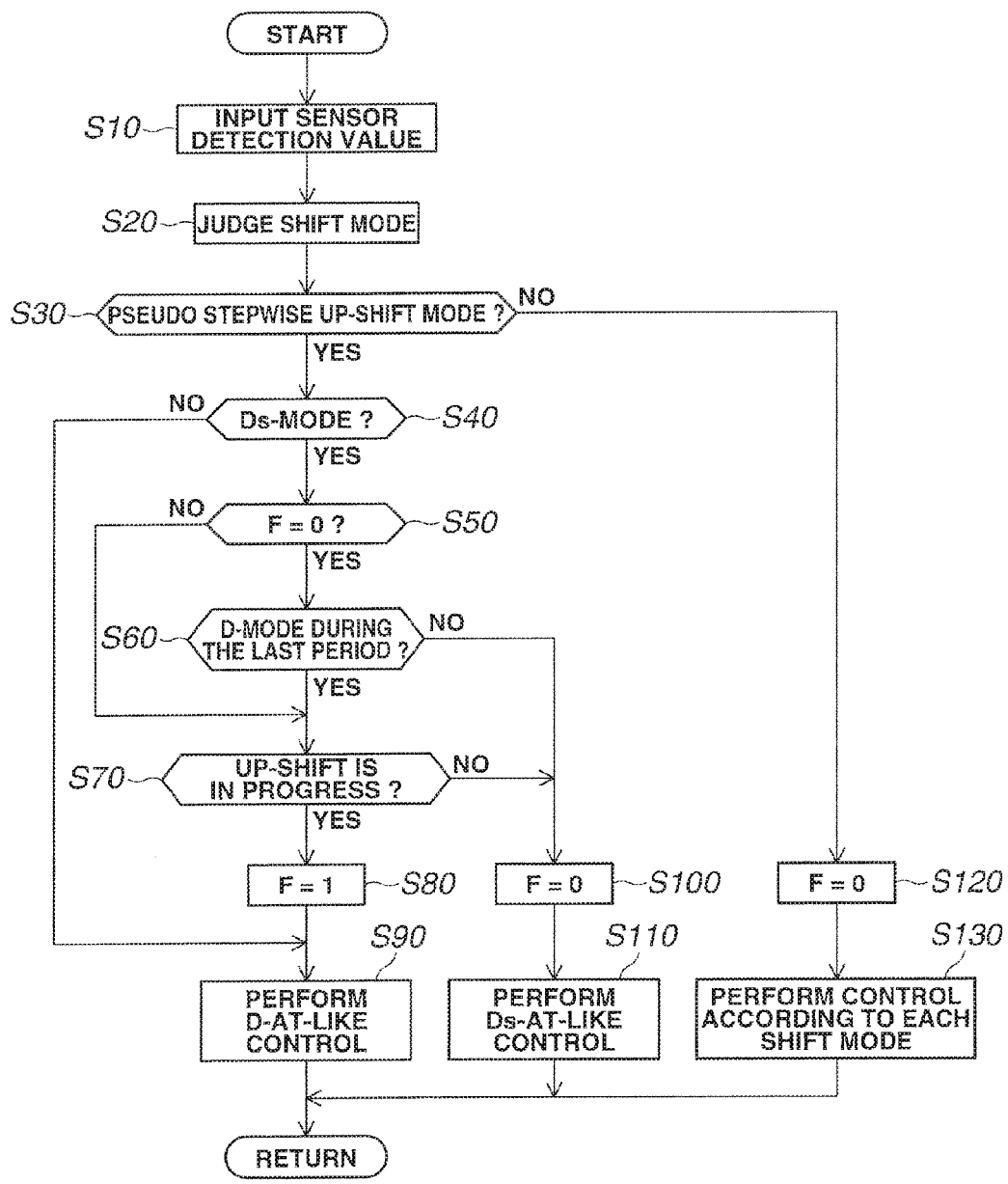

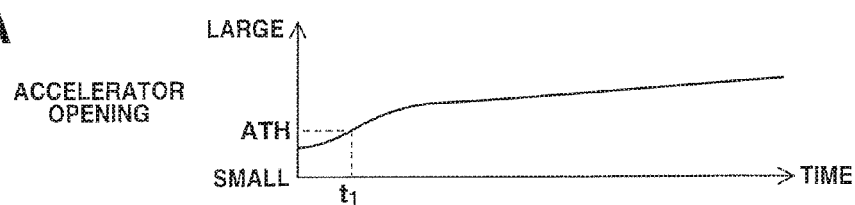
FIG.4A ACCELERATOR OPENING
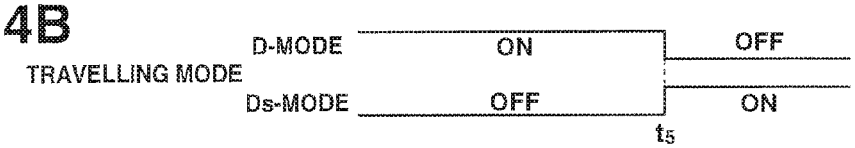
FIG.4B TRAVELLING MODE
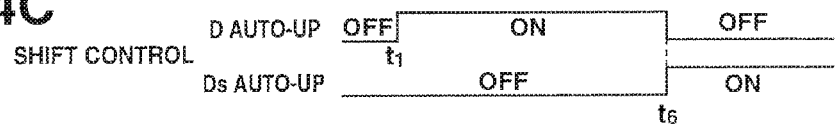
FIG.4C SHIFT CONTROL
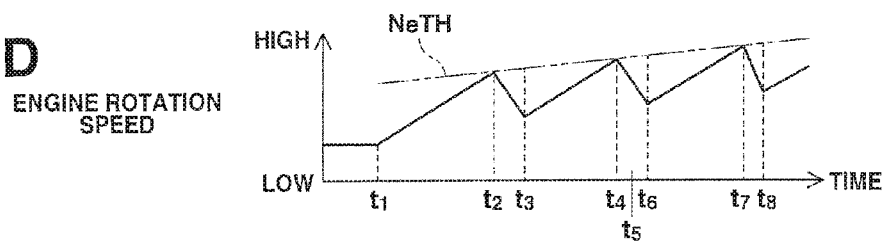
FIG.4D ENGINE ROTATION SPEED
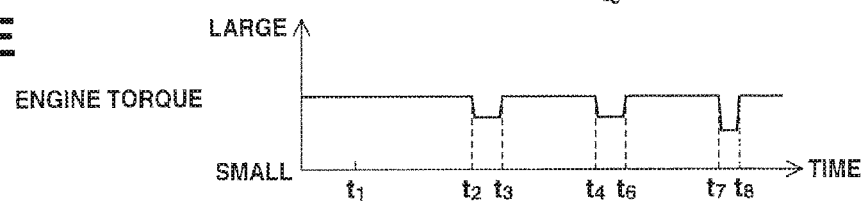
FIG.4E ENGINE TORQUE
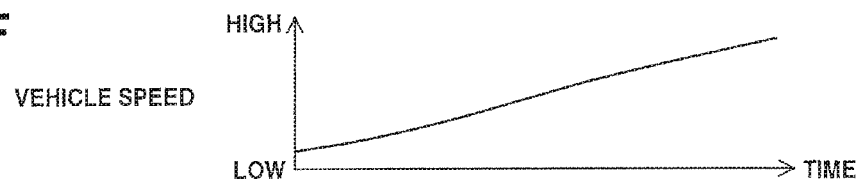
FIG.4F VEHICLE SPEED

TRANSMISSION CONTROL DEVICE FOR CONTINUOUSLY VARIABLE TRANSMISSION

The present invention relates to a transmission control device for a continuously variable transmission, which continuously varies a rotation speed of an engine as a driving source of a vehicle and outputs it.

BACKGROUND ART

As a related art, there is known, for instance, by Patent Document 1, a control device having, in addition to a normal shift mode that continuously varies a transmission ratio, a shift mode (hereinafter called a pseudo stepwise up-shift mode) that controls the transmission ratio so as to increase a vehicle speed while repeating gradual increase and rapid decrease of an engine rotation speed by varying the transmission ratio stepwise, like a stepwise variable transmission (or a multi-range transmission).

Further, there is a vehicle having a travelling mode called a sports mode that can realize a sportier run than a normal drive mode. The sports mode is a mode in which the engine rotation speed and the transmission ratio are controlled so as to be high as compared with the drive mode. The sports mode is superior to the drive mode in acceleration performance and engine brake. In a case where a driver selects such sports mode, by the fact that the continuously variable transmission is controlled to the pseudo stepwise up-shift mode, the driver can feel the stepwise up-shift during acceleration, then it is possible to produce sportier feeling.

In recent years, an attempt to produce the up-shift feeling during the acceleration by providing the pseudo stepwise up-shift mode to a plurality of drive modes has been made. For instance, the pseudo stepwise up-shift mode is provided to the drive mode, and also the pseudo stepwise up-shift mode is provided to the sports mode. In this case, by setting a shift speed during the up-shift in the pseudo stepwise up-shift mode of the sports mode to be higher than a shift speed during the up-shift in the pseudo stepwise up-shift mode of the drive mode, it is possible to obtain even sportier drive feeling.

In a control of the pseudo stepwise up-shift mode, since an inertia torque is generated by the up-shift, an engine torque control is carried out so as to cancel this inertia torque. That is, by reducing the engine torque by an amount of the inertia torque generated during the up-shift, variation of an output torque is prevented, and a shift shock upon the up-shift can be suppressed.

However, in the case where the shift speed during the up-shift in the pseudo stepwise up-shift mode is set to be different between the drive mode and the sports mode, it is also required that different torque control be performed between the drive mode and the sports mode in order to suppress the shift shock. For instance, in the case where, as described above, the shift speed during the up-shift in the pseudo stepwise up-shift mode of the sports mode is set to be higher than that of the drive mode, it is necessary to absorb the inertia torque generated during the up-shift for a short shift time.

Because of this, in the sports mode, a torque reduction amount at a start of the up-shift is greater than that of the drive mode, then the shift shock tends to be great. In other words, in the sports mode, a response of the shift is more important than the shift shock. In the drive mode, lowering the shift shock is more important than the response of the shift.

However, in a case where the driver changes the travelling mode during the progress of the up-shift in the pseudo stepwise up-shift mode, since the shift speed during the up-shift is changed halfway through the up-shift, harmonization between the pseudo stepwise up-shift control and the engine torque control cannot be made, and this causes a problem of generating the shift shock.

CITATION LIST

Patent Document

Patent Document 1: Japanese Unexamined Patent Application Publication No. 2010-7749

SUMMARY OF THE INVENTION

The present invention was made in view of the above technical problem. An object of the present invention is therefore to provide a transmission control device for the continuously variable transmission, which is capable of securing the harmonization between the pseudo stepwise up-shift control and the engine torque control and suppressing the shift shock. The object of the present invention is not limited to this. The other object of the present invention is to obtain effects by the following embodiments for carrying out the invention, which cannot be obtained by related art techniques.

The transmission control device for the continuously variable transmission according to the present invention is a transmission control device for the continuously variable transmission, which continuously varies a rotation speed of an engine mounted in a vehicle having a plurality of travelling modes and outputs the rotation speed. The transmission control device comprises a mode changing unit operated by a driver and changing the travelling mode. The transmission control device further comprises a first control unit performing a first pseudo stepwise up-shift control that when the travelling mode is a first travelling mode and a first predetermined condition is satisfied, increases a vehicle speed while repeating hold of a transmission ratio and up-shift by a first shifting speed, and reduces a torque of the engine by an amount of an inertia torque generated during the up-shift by the first shifting speed.

The transmission control device further comprises a second control unit performing a second pseudo stepwise up-shift control that when the travelling mode is a second travelling mode and a second predetermined condition is satisfied, increases the vehicle speed while repeating hold of the transmission ratio and up-shift by a second shifting speed that is faster than the first shifting speed, and reduces the torque of the engine by an amount of an inertia torque generated during the up-shift by the second shifting speed.

The transmission control device further comprises a third control unit controlling change of the travelling mode by the mode changing unit and controlling switch between the first pseudo stepwise up-shift control and the second pseudo stepwise up-shift control according to control states of the first control unit and the second control unit. The third control unit is configured to, when the travelling mode is changed from the first travelling mode to the second travelling mode by the mode changing unit during a progress of the up-shift in the first pseudo stepwise up-shift control by the first control unit, maintain the first pseudo stepwise up-shift control by the first control unit until the up-shift is completed.

It is desirable that the third control unit is configured to, when the travelling mode is changed from the second travelling mode to the first travelling mode by the mode changing unit during a progress of the up-shift in the second pseudo stepwise up-shift control by the second control unit, switch the second pseudo stepwise up-shift control by the second control unit to the first pseudo stepwise up-shift control by the first control unit before the up-shift is completed.

It is desirable that the first travelling mode is a normal drive mode, and the second travelling mode is a mode in which the transmission ratio is controlled so as to use a higher rotation speed side of the engine than that of the normal drive mode.

It is desirable that the first control unit starts the up-shift when the rotation speed gradually increases and reaches a first up-shift start rotation speed in the first pseudo stepwise up-shift control, and the second control unit starts the up-shift when the rotation speed gradually increases and reaches a second up-shift start rotation speed in the second pseudo stepwise up-shift control. In this case, it is desirable that the first up-shift start rotation speed and the second up-shift start rotation speed are set according to an acceleration demand.

According to the transmission control device for the continuously variable transmission of the present invention, in a case where the driver changes the travelling mode during the progress of the up-shift in the first pseudo stepwise up-shift control in the first travelling mode whose shifting speed is slower, the first pseudo stepwise up-shift control is maintained. With this, since the shifting speed is not changed to the faster shifting speed halfway through the up-shift, harmonization between the pseudo stepwise up-shift control and the torque control of the engine can be secured, then the shift shock is surely suppressed.

BRIEF DESCRIPTION OF DRAWINGS

FIGS. 2A and 2B are drawings showing examples of contents of a pseudo stepwise up-shift control. FIG. 2A is a first pseudo stepwise up-shift control (D auto-up). FIG. 2B is a second pseudo stepwise up-shift control (Ds auto-up).

FIG. 3 is an example of a flow chart of the pseudo stepwise up-shift control executed by the transmission control device.

FIGS. 4A to 4F are time charts for explaining control and operation of the transmission control device, which show a case where a travelling mode is changed during the progress of up-shift in D-AT-like control. FIG. 4A is accelerator opening. FIG. 4B is travelling mode. FIG. 4C is shift control. FIG. 4D is engine rotation speed. FIG. 4E is engine torque. FIG. 4F is vehicle speed.

FIG. 5A is accelerator opening. FIG. 5B is travelling mode. FIG. 5C is shift control. FIG. 5D is engine rotation speed. FIG. 5E is engine torque. FIG. 5F is vehicle speed.

FIG. 6A is accelerator opening. FIG. 6B is travelling mode. FIG. 6C is shift control. FIG. 6D is engine rotation speed. FIG. 6E is engine torque. FIG. 6F is vehicle speed.

EMBODIMENTS FOR CARRYING OUT THE INVENTION

In the following description, embodiments of the present invention will be explained with reference to the drawings. The embodiments are examples of the present invention, and these do not exclude various modifications and techniques which are not indicated in the embodiments. Each configuration of the embodiments could be realized also by being modified, combined each other, deleted or selected, as necessary.

1. General System Configuration

Figure 1:
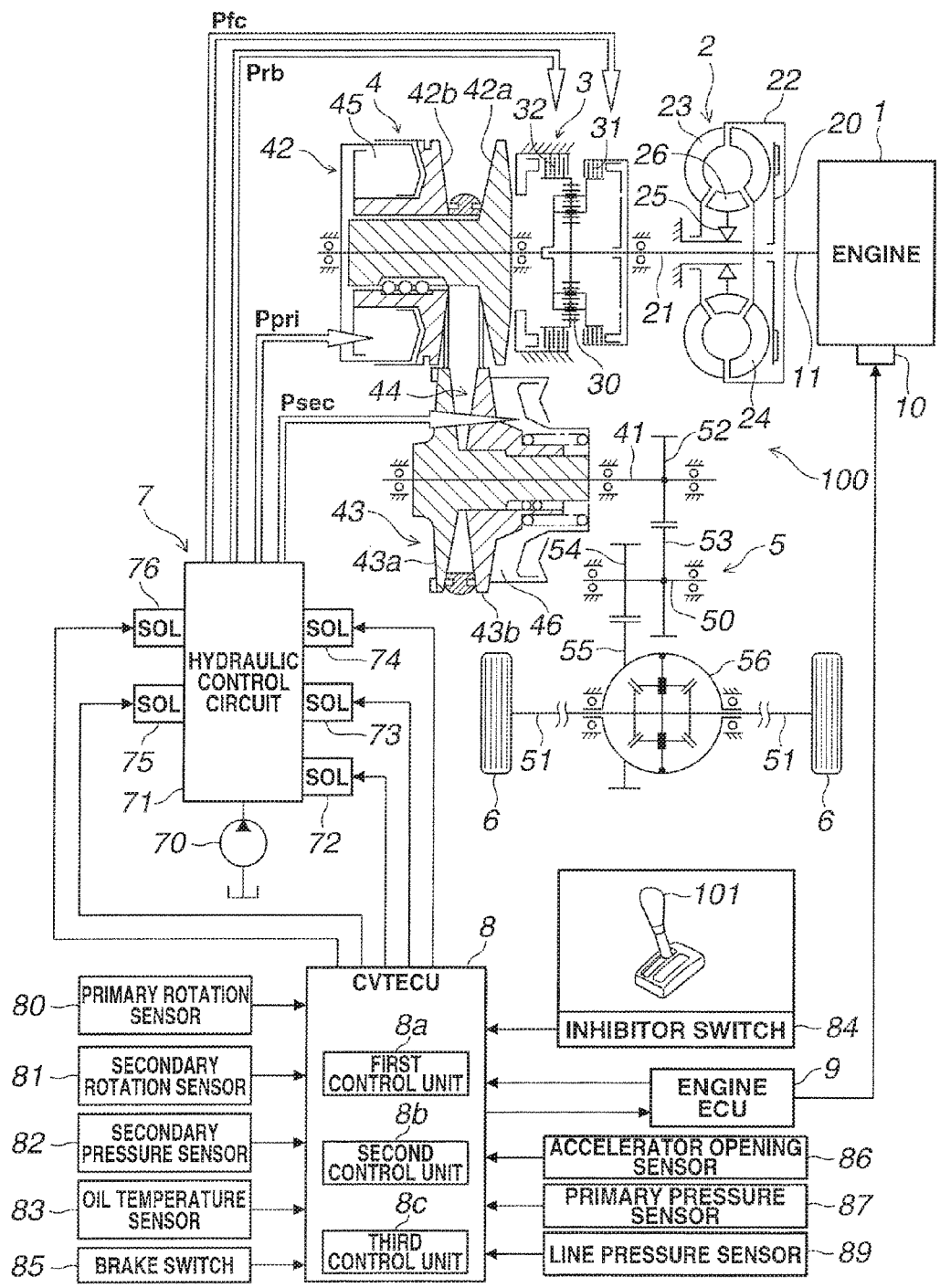
FIG. 1 is a general system diagram showing a driveline and control system of an engine vehicle that employs a transmission control device for a continuously variable transmission according to an embodiment.

FIG. 1 is a general system diagram showing a driveline and control system of a vehicle according to the present embodiment.

As shown in FIG. 1, the driveline of the vehicle has an engine (an internal combustion engine) 1, a torque convertor 2, a forward-reverse switching mechanism 3, a belt-type continuously variable transmission mechanism (an automatic transmission mechanism) 4, a final speed reduction mechanism 5 and driving wheels 6, 6. Here, the torque convertor 2, the forward-reverse switching mechanism 3, the belt-type continuously variable transmission mechanism 4 and the final speed reduction mechanism 5 are accommodated in a transmission case, and this forms a belt-type continuously variable transmission 100 (hereinafter described as a CVT 100).

The engine 1 is provided with an output torque control actuator 10 that performs an output torque control by a throttle valve opening/closing operation and/or a fuel cut operation etc. With this control, besides an output torque control by driver's accelerator operation, the engine 1 can be output-torque-controlled by an external engine control signal.

The torque convertor 2 is a starting element having a torque increase function. The torque convertor 2 has a lock-up clutch 20 that can directly connect an engine output shaft 11 (=a torque convertor input shaft) and a torque convertor output shaft 21 when the torque increase function is not required. The torque convertor 2 further has, as components, a pump impeller 23 directly connected to the engine output shaft 11 through a convertor housing 22, a turbine runner 24 directly connected to the torque convertor output shaft 21 and a stator 26 provided at a case through a one-way clutch 25.

The forward-reverse switching mechanism 3 is a mechanism that switches an input rotation direction to the belt-type continuously variable transmission mechanism 4 between a forward direction for forward travel and a reverse direction for reverse travel. This forward-reverse switching mechanism 3 has a double pinion planetary gear 30, a forward clutch 31 (a forward side frictional engagement element) formed by a plurality of clutch plates and a reverse brake 32 (a reverse side frictional engagement element) formed by a plurality of brake plates.

The forward clutch 31 is engaged by a forward clutch pressure Pfc when a forward travel range such as D-range (Drive range) and Ds-range (Drive sports range) is selected. The reverse brake 32 is engaged by a reverse brake pressure Prb when R-range that is reverse travel range is selected. Here, when N-range (Neutral range, no-travel range) is selected, the forward clutch 31 and the reverse brake 32 are each disengaged by draining the forward clutch pressure Pfc and the reverse brake pressure Prb.

The belt-type continuously variable transmission mechanism 4 has a continuously variable transmission function that continuously varies a transmission ratio that is a ratio between a transmission input rotation speed and a transmission output rotation speed (i.e. the transmission input rotation speed/the transmission output rotation speed) by change of a belt contact diameter. The belt-type continuously variable transmission mechanism 4 has a primary pulley 42, a secondary pulley 43 and a belt 44. The primary pulley 42 is formed by a fixed pulley 42a and a slide pulley 42b. The slide pulley 42b moves in an axial direction by a primary pressure Ppri that is supplied in a primary pressure chamber 45. The secondary pulley 43 is formed by a fixed pulley 43a and a slide pulley 43b. The slide pulley 43b moves in an axial direction by a secondary pressure Psec that is supplied in a secondary pressure chamber 46.

Sheave surfaces, which are facing surfaces, of the fixed pulley 42a and the slide pulley 42b of the primary pulley 42, and sheave surfaces, which are facing surfaces, of the fixed pulley 43a and the slide pulley 43b of the secondary pulley 43, each have a V-shaped surface. Flank surfaces at both sides of the belt 44 contact each of these sheave surfaces. A winding radius of the belt 44, which is wound around both the primary pulley 42 and secondary pulley 43, is changed according to movement of the slide pulleys 42b and 43b, and thus the transmission ratio is varied.

The final speed reduction mechanism 5 is a mechanism that reduces a transmission output rotation from a transmission output shaft 41 of the belt-type continuously variable transmission mechanism 4 and transmits it to the right and left driving wheels 6, 6 with a differential function provided. This final speed reduction mechanism 5 has a first gear 52, a second gear 53, a third gear 54 and a fourth gear 55, which are installed by the transmission output shaft 41, an idler gear 50 and right and left drive shafts 51, 51 and which have a speed reduction function, and a differential gear 56 which has the differential function.

As shown in FIG. 1, a control system of the CVT 100, of the control system of the vehicle, has a hydraulic control unit 7 and a CVT electronic control unit 8 (a transmission control device, hereinafter called a CVTECU 8). Further, an engine electronic control unit 9 (hereinafter called an engine ECU 9) that sends/receives information to/from this CVTECU 8 is provided. These electronic control units (ECU: Electronic Control Unit) 8, 9 are formed by an input/output device, a storage device (ROM, RAM etc.) that stores a plurality of control program, a central processing unit (CPU), a timer counter etc.

The hydraulic control unit 7 is a control unit that produces the primary pressure Ppri led to the primary pressure chamber 45, the secondary pressure Psec led to the secondary pressure chamber 46, the forward clutch pressure Pfc for the forward clutch 31 and the reverse brake pressure Prb for the reverse brake 32. This hydraulic control unit 7 has an oil pump 70 and a hydraulic control circuit 71. The hydraulic control circuit 71 has a line pressure solenoid 72, a primary pressure solenoid 73, a secondary pressure solenoid 74, a forward clutch pressure solenoid 75 and a reverse brake pressure solenoid 76.

The line pressure solenoid 72 regulates, according to a line pressure instruction outputted from the CVTECU 8, a working fluid (a hydraulic fluid) that is pumped out and pressurized by the oil pump 70 to an instructed line pressure PL.

The primary pressure solenoid 73 reduces and regulates, according to a primary pressure instruction outputted from the CVTECU 8, the line pressure PL as a source pressure to an instructed primary pressure Ppri.

The secondary pressure solenoid 74 reduces and regulates, according to a secondary pressure instruction outputted from the CVTECU 8, the line pressure PL as the source pressure to an instructed secondary pressure Psec.

The forward clutch pressure solenoid 75 reduces and regulates, according to a forward clutch pressure instruction outputted from the CVTECU 8, the line pressure PL as the source pressure to an instructed forward clutch pressure Pfc.

The reverse brake pressure solenoid 76 reduces and regulates, according to a reverse brake pressure instruction outputted from the CVTECU 8, the line pressure PL as the source pressure to an instructed reverse brake pressure Prb.

Sensors and switches, such as a primary rotation sensor 80, a secondary rotation sensor 81, a secondary pressure sensor 82, an oil temperature sensor 83, an inhibitor switch 84, a brake switch 85, an accelerator opening sensor 86, a primary pressure sensor 87 and a line pressure sensor 89, are connected to the CVTECU 8. The CVTECU 8 then inputs sensor information and switch information detected by these sensors and switches.

Further, the CVTECU 8 inputs information of torque and a rotation speed Ne from the engine ECU 9, and outputs a torque request to the engine ECU 9.

The vehicle is provided with a shift lever (also called a select lever, a mode changing unit) 101 for changing (selecting) the travelling mode. The inhibitor switch 84 detects a range position (D-range, Ds-range, N-range, R-range etc.) selected by the shift lever 101, and outputs a range position signal according to the range position.

Hereinafter, a travelling mode (a first travelling mode) of a case where D-range is selected by the shift lever 101 is called a D-mode. A travelling mode (a second travelling mode) of a case where Ds-range is selected by the shift lever 101 is called a Ds-mode. The D-mode is a drive mode, and this mode is selected for a normal travel. The Ds-mode is a so-called sports mode, and this mode is selected when the driver desires to realize a sportier run than the D-mode.

The Ds-mode is a mode in which as compared with the D-mode, the transmission ratio is controlled so as to use a high rotation speed side (a high rotation speed region) of the engine 1. When the Ds-mode is selected, the transmission ratio is controlled so that even at a same vehicle speed, the engine rotation speed Ne becomes high (the transmission ratio is lower side, namely that the transmission ratio becomes large). With this control, the Ds-mode is superior to the D-mode in acceleration performance and engine brake. In the present embodiment, the travelling mode has two kinds of modes, i.e. the D-mode and the Ds-mode.

As objects of control by the CVTECU 8, they are a line pressure control that outputs an instruction to obtain a target line pressure according to a throttle opening etc. to the line pressure solenoid 72, a transmission hydraulic pressure control that outputs an instruction to obtain a target transmission ratio according to the vehicle speed and/or throttle opening etc. to the primary pressure solenoid 73 and the secondary pressure solenoid 74, and a forward-reverse switching control that outputs an instruction to control engagement/disengagement of the forward clutch 31 and the reverse brake 32 to the forward clutch pressure solenoid 75 and the reverse brake pressure solenoid 76. In the present embodiment, the transmission control (the shift control) will be explained, particularly a pseudo stepwise up-shift control will be explained in detail.

2. Summary of Control

[2-1. Transmission Control]

The transmission control (the shift control) is a control that selects a proper shift mode according to e.g. an accelerator opening AP detected by the accelerator opening sensor 86, a rate of change ΔAP of the accelerator opening and ON/OFF of the brake switch 85, and varies the transmission ratio of the CVT 100 according to the shift mode.

Here, seven shift modes; an auto up-shift, a foot back up-shift, a foot release up-shift, a depression down-shift, a sudden depression down-shift, a brake down-shift and a pseudo stepwise up-shift, are provided. These shift modes are selected according to a load of the engine 1, the engine rotation speed Ne, the accelerator opening AP, the rate of change ΔAP of the accelerator opening, ON/OFF of the brake switch 85, the vehicle speed etc. Since the six shift modes except the pseudo stepwise up-shift are well-known shift modes, their explanations will be omitted here.

[2-2. Pseudo Stepwise Up-Shift Control]

The pseudo stepwise up-shift control is a control that controls the transmission ratio so as to increase the vehicle speed while repeating gradual increase and rapid decrease of the rotation speedNe of the engine 1 by varying the transmission ratio stepwise, like a stepwise variable transmission (or a multi-range transmission). In the following description, a shift mode in which the pseudo stepwise up-shift control is carried out is called a pseudo stepwise up-shift mode.

In the pseudo stepwise up-shift mode, the vehicle speed is increased while repeating hold of the transmission ratio and the up-shift according to the accelerator opening AP detectedby the accelerator opening sensor 86, the rate of change ΔAP of the accelerator opening and ON/OFF of the brake switch 85 etc. The hold of the transmission ratio mentioned here does not mean that a constant transmission ratio is completely held, but means that the transmission ratio is held within a certain range.

That is, in the pseudo stepwise up-shift mode, a state in which the transmission ratio is not greatly changed (the transmission ratio is not given a great change), unlike the up-shift, is held for a certain period, and after that, the up-shift is carried out with the transmission ratio greatly changed. The transmission ratio then varies stepwise. Here, the period for which the transmission ratio is held is a time from a time point when the pseudo stepwise up-shift mode is selected or a time point of an end of the up-shift to a time when the engine rotation speed Ne reaches a predetermined up-shift start rotation speed NeTH.

The pseudo stepwise up-shift mode in which the pseudo stepwise up-shift control is carried out is selected when the following conditions 1 to 3 are all satisfied.

Condition 1: the accelerator opening AP is equal to or greater than a predetermined threshold value ATH (AP≥ATH)

Condition 2: the rate of change ΔAP of the accelerator opening is equal to or greater than 0 and is less than a predetermined value B (0≤ΔAP<B)

Condition 3: the brake switch is OFF

That is, the pseudo stepwise up-shift mode is selected when only an accelerator pedal is depressed gently more than or equal to the predetermined threshold value ATH (with a magnitude of ΔAP<B). Here, when the condition 1 is not satisfied and the conditions 2 and 3 are satisfied, the above auto up-shift is selected. When the condition 2 is not satisfied and the conditions 1 and 3 are satisfied, the above depression down-shift, the sudden depression down-shift etc. are selected. In other words, the conditions 1 to 3 are judging conditions (a first predetermined condition, a second predetermined condition) as to whether the pseudo stepwise up-shift mode is selected or the shift mode except the pseudo stepwise up-shift mode is selected.

Here, the pseudo stepwise up-shift mode includes two modes, and either one of them is selected according to the travelling mode selected when the conditions 1 to 3 are satisfied. More specifically, two controls; a first pseudo stepwise up-shift control (hereinafter called D-AT-like control) that is performed when the travelling mode is the D-mode and a second pseudo stepwise up-shift control (hereinafter called Ds-AT-like control) that is performed when the travelling mode is the Ds-mode, are included.

The D-AT-like control is a control that is performed when the conditions 1 to 3 are all satisfied and also the travelling mode is the D-mode. More specifically, as shown in FIG. 2A, the engine rotation speed Ne is gradually increased by holding the transmission ratio, and when the engine rotation speed Ne reaches the up-shift start rotation speed NeTH, the up-shift is carried out by a predetermined shift amount R (i.e. the transmission ratio becomes small by the predetermined shift amount R) at a first shifting speed Vs1. Here, a time required to carry out the up-shift by the shift amount R at the first shifting speed Vs1 is called a first shifting time ts1.

Further, in the D-AT-like control, the torque of the engine 1 is reduced by an amount of an inertia torque generated during the up-shift. More specifically, as shown in FIG. 2A, the torque is reduced by a predetermined amount T1 from a time point when the engine rotation speed Ne reaches the up-shift start rotation speed NeTH, and the torque is increased and returned almost at the same time as when the first shifting time ts1 is ended (the first shifting time ts1 elapses). Here, the predetermined amount T1 is almost equal to a value that is obtained by dividing the inertia torque, which is decreased, by the first shifting time ts1. That is, the engine torque is reduced by the amount of the inertia torque by taking the first shifting time ts1. Here, for convenience of explanation, the engine torque is constant.

On the other hand, the Ds-AT-like control is a control that is performed when the conditions 1 to 3 are all satisfied and also the travelling mode is the Ds-mode. More specifically, as shown in FIG. 2B, the engine rotation speed Ne is gradually increased by holding the transmission ratio, and when the engine rotation speed Ne reaches the up-shift start rotation speed NeTH, the up-shift is carried out by a predetermined shift amount R (i.e. the transmission ratio becomes small by the predetermined shift amount R) at a second shifting speed Vs2. Here, a time required to carry out the up-shift by the shift amount R at the second shifting speed Vs2 is called a second shifting time ts2.

The second shifting speed Vs2 is set to be faster (higher) than the first shifting speed Vs1 of the D-AT-like control in order to realize sporty-riding comfort. On the other hand, since the shift amount R is set to the same amount here, the second shifting time ts2 is shorter than the first shifting time ts1. That is, in the case where the pseudo stepwise up-shift control is performed when the Ds-mode is selected, since the up-shift is carried out for a shorter time than that of the pseudo stepwise up-shift control in the D-mode, a good response of the shift can be obtained.

Further, also in the Ds-AT-like control, the torque of the engine 1 is reduced by an amount of an inertia torque generated during the up-shift. More specifically, as shown in FIG. 23, the torque is reduced by a predetermined amount T2 from a time point when the engine rotation speed Ne reaches the up-shift start rotation speed NeTH, and the torque is increased and returned almost at the same time as when the second shifting time ts2 is ended (the second shifting time ts2 elapses). Here, the predetermined amount T2 is almost equal to a value that is obtained by dividing the inertia torque, which is decreased, by the second shifting time ts2. That is, the engine torque is reduced by the amount of the inertia torque by taking the second shifting time ts2.

Here, since the shift amounts R during the up-shift in the Ds-AT-like control and the D-AT-like control are the same, the inertia torques generated during the up-shift are the same. Because of this, the predetermined amount T2 of the torque which is reduced at a start of the up-shift in the Ds-AT-like control is greater than the predetermined amount T1 of the torque which is reduced at a start of the up-shift in the D-AT-like control.

For this reason, as compared with the D-AT-like control, in the Ds-AT-like control, shift shock upon the up-shift tends to be great. In other words, in the Ds-AT-like control, the response of the shift is more important than the shift shock. In the D-AT-like control, lowering the shift shock is more important than the response of the shift.

Here, a condition (an up-shift start condition) of switch from the hold of the transmission ratio to the up-shift in the D-AT-like control and the Ds-AT-like control is "the engine rotation speed Ne reaches the up-shift start rotation speed NeTH" as described above. The up-shift start rotation speed NeTH is set according to driver's acceleration demand. For instance, a magnitude of the acceleration demand is determined by a magnitude of the accelerator opening AP, and the smaller the accelerator opening AP, the lower the up-shift start rotation speed NeTH is set, and the larger the accelerator opening AP, the higher the up-shift start rotation speed NeTH is set.

Here, there is a case where the travelling mode is changed during the progress of the pseudo stepwise up-shift control by the driver. In this case, the D-AT-like control and the Ds-AT-like control are switched according to the change of the travelling mode.

However, in a case where the travelling mode is changed to the Ds-mode during the progress of the up-shift in the D-AT-like control, the D-AT-like control is maintained until the up-shift is completed. That is, in the D-AT-like control shown in FIG. 2A, although the hold of the transmission ratio and the up-shift by the first shifting speed Vs1 are repeated, in a case where the travelling mode is changed to the Ds-mode during the progress of this up-shift, the switch of the shift control is not made (the current control is maintained) until the up-shift is completed, then after the completion of the up-shift by the first shifting speed Vs1, the control is switched to the Ds-AT-like control shown in FIG. 2B.

This is because it is difficult for the engine torque, which is being controlled according to the control whose shifting speed is slower (or lower), to be changed in response to the switch to the control whose shifting speed is faster (or higher) during the progress of the up-shift, and also the shift shock might occur due to lost balance between the shift and the engine torque. That is, in a case where the travelling mode is changed to the Ds-mode during the progress of the up-shift in the D-AT-like control whose shifting speed is slower (or lower), since the shifting speed in a post-switch shift control is faster (or higher), by waiting for the switch of the shift control until the up-shift is completed, it is possible to surely suppress the shift shock.

On the other hand, in a case where the travelling mode is changed to the D-mode during the progress of the up-shift in the Ds-AT-like control, the switch to the D-AT-like control is performed at the same time as the change of the travelling mode without waiting for the completion of the up-shift. That is, in a case where the Ds-AT-like control shown in FIG. 2B is performed, although the hold of the transmission ratio and the up-shift by the second shifting speed Vs2 are repeated, in a case where the travelling mode is changed to the D-mode during the progress of this up-shift, switch from the up-shift by the second shifting speed Vs2 to the up-shift by the first shifting speed Vs1 of the D-AT-like control shown in FIG. 2A is performed during the progress of the up-shift.

This is because, since the engine torque is controlled according to the control whose shifting speed is faster (or higher), it is relatively easy to change the torque control in response to the switch to the control whose shifting speed is slower (or lower) during the progress of the up-shift. That is, in a case where the travelling mode is changed to the D-mode during the progress of the up-shift in the Ds-AT-like control whose shifting speed is faster (or higher), since the shifting speed in a post-switch shift control is slower (or lower), it is possible to immediately perform the switch of the shift control while controlling the engine torque so that the shift shock does not occur. The control according to driver's intention can be therefore possible.

3. Control Configuration

As shown in FIG. 1, the CVTECU 8 has, as elements to execute the above controls, a first control unit 8a, a second control unit 8b and a third control unit 8c. These elements could be realized by an electronic circuit (hardware) or by programmed software. Or alternatively, part of function of the element might be provided as the hardware, and the others might be provided as the software.

The first control unit (a first control means) 8a is a unit that executes the above D-AT-like control. That is, the first control unit 8a performs the shift control that increases the vehicle speed while repeating the hold of the transmission ratio and the up-shift by the first shifting speed Vs1 when the conditions 1 to 3 are all satisfied and also the travelling mode is the D-mode. Further, the first control unit 8a instructs the engine ECU 9 to perform the torque control that reduces the torque of the engine 1 by the amount of the inertia torque generated during the up-shift by the first shifting speed Vs1.

Moreover, the first control unit 8a sets the up-shift start rotation speed NeTH that is the up-shift start condition according to the acceleration demand. For instance, the CVTECU 8 previously stores a map defining a relationship between the accelerator opening AP and the up-shift start rotation speed NeTH and arithmetic expression etc., and the first control unit 8a sets the up-shift start rotation speed NeTH by applying the accelerator opening AP detected by the accelerator opening sensor 86 to the map and/or the arithmetic expression.

The second control unit (a second control means) 8b is a unit that executes the above Ds-AT-like control. That is, the second control unit 8b performs the shift control that increases the vehicle speed while repeating the hold of the transmission ratio and the up-shift by the second shifting speed Vs2 when the conditions 1 to 3 are all satisfied and also the travelling mode is the Ds-mode. Further, the second control unit 8b instructs the engine ECU 9 to perform the torque control that reduces the torque of the engine 1 by the amount of the inertia torque generated during the up-shift by the second shifting speed Vs2.

Moreover, the second control unit 8b sets the up-shift start rotation speed NeTH that is the up-shift start condition according to the acceleration demand. Here, in the same manner as the first control unit 8a, the second control unit 8b sets the up-shift start rotation speed NeTH. That is, the CVTECU 8 previously stores a map defining a relationship between the accelerator opening AP and the up-shift start rotation speed NeTH and arithmetic expression etc., and the second control unit 8b sets the up-shift start rotation speed NeTH by applying the accelerator opening AP detected by the accelerator opening sensor 86 to the map and/or the arithmetic expression. With this setting, the same up-shift start rotation speed NeTH as the up-shift start rotation speed NeTH that is set by the first control unit 8a is set.

The third control unit (a third control means) 8c is a unit that controls the change of the travelling mode by driver's shift operation and controls the switch between the D-AT-like control and the Ds-AT-like control according to control states of the first control unit 8a and the second control unit 8b. When the third control unit 8c inputs information that the travelling mode is changed from the inhibitor switch 84 during the progress of the up-shift while the D-AT-like control by the first control unit 8a or the Ds-AT-like control by the second control unit 8b is in progress, the third control unit 8c performs the hold or the switch of the shift control according to the change of the travelling mode.

More specifically, in a case where the travelling mode is changed from the D-mode to the Ds-mode during the progress of the up-shift in the D-AT-like control by the first control unit 8a, the third control unit 8c instructs the first control unit 8a to maintain the D-AT-like control until the up-shift is completed, and also instructs the second control unit 8b not to perform the Ds-AT-like control until the up-shift is completed. That is, in this case, the switch of the shift control is not made (a current shift control is maintained) until the up-shift is completed, and after the completion of the up-shift, the shift control is switched. For this reason, a change timing of the travelling mode and a switch timing of the shift control are shifted in time.

Further, in a case where the travelling mode is changed from the Ds-mode to the D-mode during the progress of the up-shift in the Ds-AT-like control by the second control unit 8b, the third control unit 8c instructs the first control unit 8a and the second control unit 8b to switch the Ds-AT-like control to the D-AT-like control before the completion of the up-shift. That is, in this case, since the shift control is switched before the completion of the up-shift, the change timing of the travelling mode and the switch timing of the shift control are substantially the same.

4. Flow Chart

Next, an example of procedure of the shift control executed by the CVTECU 8 will be explained using FIG. 3. This flow chart is repeated at a predetermined operating cycle period.

As shown in FIG. 3, at step S10, the CVTECU 8 inputs the sensor information and the switch information detected by the sensors and switches 80 to 89. At step S20, the shift mode is judged on the basis of each information inputted at step S10.

At step S30, a judgment is made as to whether or not the shift mode judged at step S20 is the pseudo stepwise up-shift mode, namely it is judged whether or not a current control is either one of the D-AT-like control and the Ds-AT-like control. If the pseudo stepwise up-shift mode is judged, the routine proceeds to step S40. If a shift mode except the pseudo stepwise up-shift mode is judged, the routine proceeds to step S120. At step S40, a judgment is made as to whether or not the travelling mode selected by the driver is the Ds-mode by the switch information of the inhibitor switch 84. If the travelling mode is the Ds-mode, the routine proceeds to step S50. If it is not the Ds-mode, it is judged that the D-mode is selected, and the routine proceeds to step S90.

At step S50, a judgment is made as to whether or not a flag F is F=0. Here, the flag F is a variable for checking whether or not the CVTECU 8 is waiting for the switch of the shift control by the third control unit 8c. F=1 corresponds to a waiting state, F=0 corresponds to a no-waiting state. If the flag F is F=0, the routine proceeds to step S60, and a judgment is made as to whether or not the travelling mode judged at step S40 at the last operating cycle period is the D-mode.

If the travelling mode at the last operating cycle period is the D-mode, since this means that the travelling mode is changed from the D-mode to the Ds-mode at a current operating cycle period, the routine proceeds to step S70, and a judgment is made as to whether or not the up-shift is in progress. If the up-shift is in progress, this means that the up-shift is in progress in the D-AT-like control. Thus, at step S80, the flag F is set to 1 (F=1), and the CVTECU 8 waits for the switch of the shift control from the D-AT-like control to the Ds-AT-like control. That is, at step S90, the D-AT-like control continues being performed, and this operating cycle period is ended and the routine is returned.

At a next operating cycle period, a process from step S10 is repeated. If the shift mode and the travelling mode are not changed, the routine proceeds from step S40 to step S50. At this time, since the flag F is set to 1 (F=1), the routine proceeds to step S70 by skipping step S60, and a judgment is made as to whether or not the up-shift is completed. That is, for a time period until the up-shift is completed, even if the travelling mode is the Ds-mode, the D-AT-like control is performed. If the up-shift is completed at step S70, the routine proceeds to step S100, and the flag F is set to 0 (F=0). Then, at step S110, the Ds-AT-like control is carried out. That is, the shift control is switched at this timing.

Further, if the up-shift is not in progress when the routine proceeds from step S60 to step S70 (i.e. when the travelling mode is changed from the D-mode to the Ds-mode), the routine proceeds to step S100, and the flag F is set to 0 (F=0). Then, at step S110, the Ds-AT-like control is carried out, and this operating cycle period is ended and the routine is returned. That is, only when the travelling mode is changed to the Ds-mode during the progress of the up-shift in the D-AT-like control, the CVTECU 8 waits for the switch of the shift control (i.e. the switch of the shift control is not made) and the current control is maintained.

On the other hand, if the travelling mode at the last operating cycle period is already the Ds-mode at step S60, the routine proceeds from step S60 to step S100, and the flag F is set to 0 (F=0). Then, at step S110, the Ds-AT-like control is carried out, and this operating cycle period is ended and the routine is returned. That is, when the Ds-AT-like control is already performed, as long as the shift mode and the travelling mode are not changed, the Ds-AT-like control continues.

Further, if the travelling mode is changed to the D-mode during the progress of the Ds-AT-like control, the routine proceeds from step S40 to step S90, and the shift control is immediately switched to the D-AT-like control.

Here, if the shift mode is a mode (e.g. the auto up-shift, the foot back up-shift etc.) except the pseudo stepwise up-shift mode, the routine proceeds to step S120, and the flag F is set to 0 (F=0). Then, at step S130, a shift control according to a shift mode judged at step S20 is carried out, and this operating cycle period is ended and the routine is returned.

5. Operation

Next, the shift control by the transmission control device of the present invention will be explained using FIGS. 4A to 4F and 5A to 5F. FIGS. 4A to 4F are time charts of a case where the travelling mode is changed during the progress of the up-shift in the D-AT-like control. FIGS. 5A to 5F are time charts of a case where the travelling mode is changed during the progress of the up-shift in the Ds-AT-like control.

As shown in FIGS. 4A and 4B, when the accelerator opening AP gently becomes the predetermined threshold value ATH or greater (with the rate of change ΔAP of the accelerator opening being equal to or greater than 0 and is less than the predetermined value B) in a state in which the travelling mode is the D-mode at time t1 and the brake switch is OFF at this time, as shown in FIG. 4C, the D-AT-like control by the first control unit 8a is started (the D-AT-like control is ON). With this, as shown in FIG. 4D, the engine rotation speed Ne gradually increases, and as shown in FIG. 4F, the vehicle speed increases.

When a time at which the engine rotation speed Ne reaches the up-shift start rotation speed NeTH indicated by a two-dot chain line in FIG. 4D is time t2, the up-shift is started at the first shifting speed Vs1 from time t2, and the up-shift is carried out by the predetermined shift amount R (see FIG. 2A). With this, while the vehicle speed continues increasing, the engine rotation speed Ne rapidly decreases. Further, as shown in FIG. 4E, the engine torque is reduced for a time period from this time t2 to time t3 at which the up-shift is completed, and the shift shock is suppressed. Here, the up-shift start rotation speed NeTH increases with increase of the accelerator opening AP.

When the engine rotation speed Ne gradually increases again from time t3 and reaches the up-shift start rotation speed NeTH at time t4, the up-shift is started again. Here, as shown in FIGS. 4B and 4D, in a case where the travelling mode is changed from the D-mode to the Ds-mode at time t5 before the completion of the up-shift, the third control unit 8c waits for the switch of the shift control (i.e. the switch of the shift control is not made and the current control is maintained) until the up-shift is completed.

Then, when the up-shift is completed at time t6, a command is outputted to the first control unit 8a and the second control unit 8b from the third control unit 8c, and the D-AT-like control is ended (the D-AT-like control is OFF), and the Ds-AT-like control is started (the Ds-AT-like control is ON). With this, the engine torque during the progress of the up-shift is torque-controlled in the D-AT-like control, and the shift shock is suppressed.

Since the Ds-AT-like control is performed after time t6, at time t7 at which the engine rotation speed Ne reaches the up-shift start rotation speed NeTH, the up-shift by the second shifting speed Vs2 is started. Further, for a time period up to the time t8 at which the up-shift is completed, the engine torque is reduced by the amount of the inertia torque generated during the up-shift, and the shift shock is suppressed.

Figure 5A:
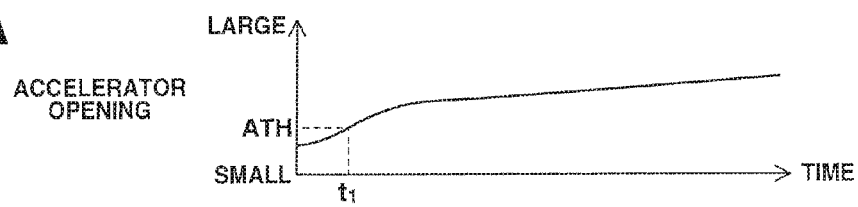
FIGS. 5A to 5F are time charts for explaining control and operation of the transmission control device, which show a case where a travelling mode is changed during the progress of up-shift in Ds-AT-like control.
Figure 5B:
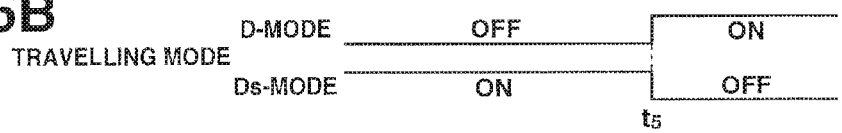
Figure 5C:
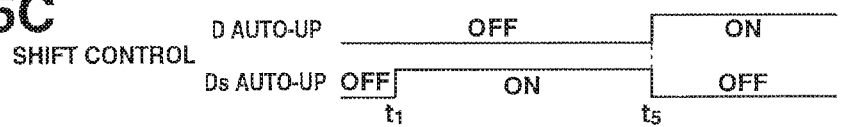

On the other hand, as shown in FIGS. 5A and 5B, when the accelerator opening AP gently becomes the predetermined threshold value ATH or greater (with the rate of change ΔAP of the accelerator opening being equal to or greater than 0 and is less than the predetermined value B) in a state in which the travelling mode is the Ds-mode at time t1 and the brake switch is OFF at this time, as shown in FIG. 5C, the Ds-AT-like control by the second control unit 8b is started (the Ds-AT-like control is ON). With this, as shown in FIG. 5D, the engine rotation speed Ne gradually increases, and as shown in FIG. 5F, the vehicle speed increases.

Figure 5D:
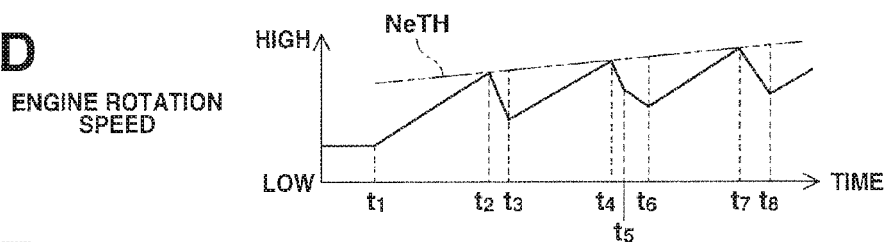
Figure 5E:
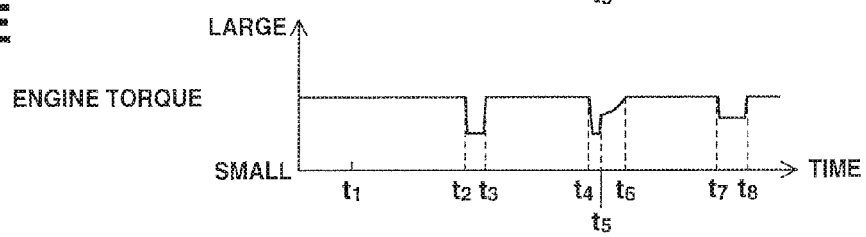
Figure 5F:
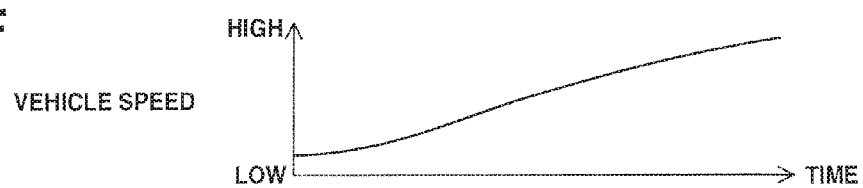
Figure 6A:
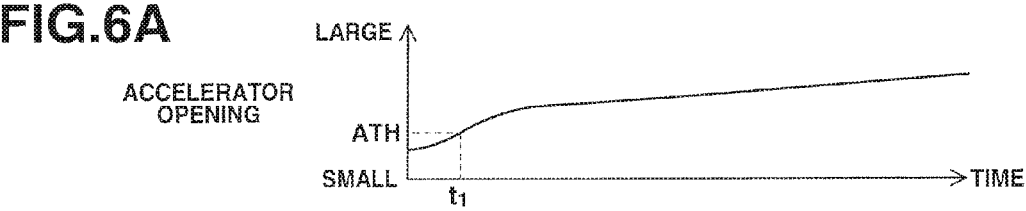
FIGS. 6A to 6F are time charts for explaining control and operation of the transmission control device of a modified example, which show a case where a travelling mode is changed during the progress of up-shift in Ds-AT-like control.
Figure 6B:
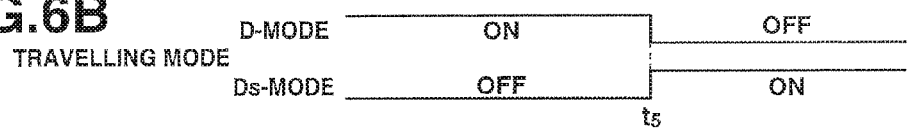
Figure 6C:
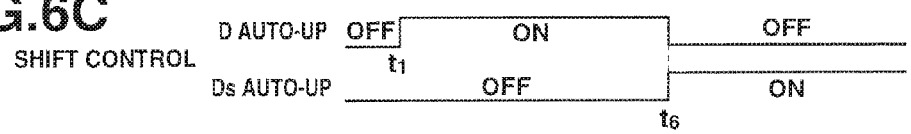
Figure 6D:
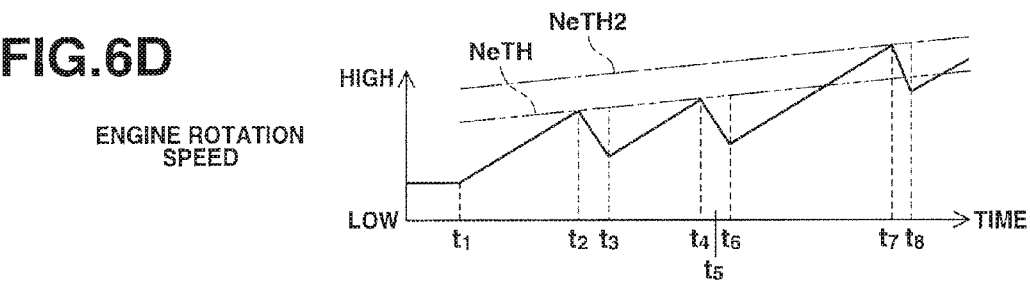
Figure 6E:
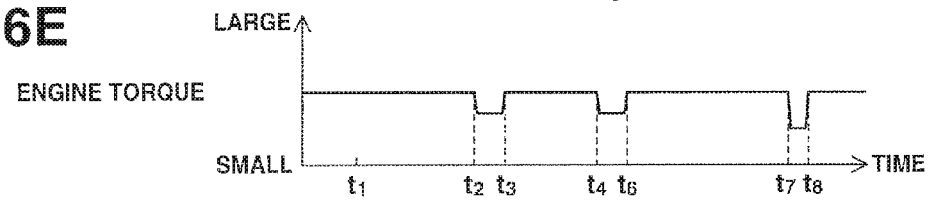
Figure 6F:
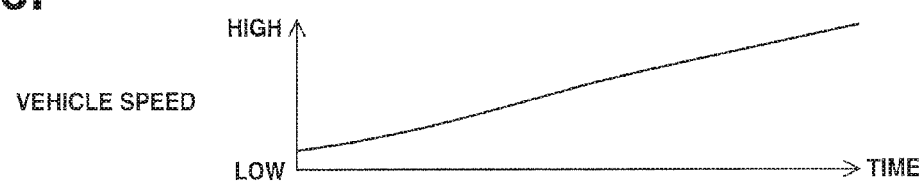

When a time at which the engine rotation speed Ne reaches the up-shift start rotation speed NeTH indicated by a two-dot chain line in FIG. 5D is time t2, the up-shift is started at the second shifting speed Vs2 from time t2, and the up-shift is carried out by the predetermined shift amount R (see FIG. 2B). With this, while the vehicle speed continues increasing, the engine rotation speed Ne rapidly decreases. Further, as shown in FIG. 5E, the engine torque is reduced for a time period from this time t2 to time t3 at which the up-shift is completed, and the shift shock is suppressed. Here, the up-shift start rotation speed NeTH increases with increase of the accelerator opening AP.

When the engine rotation speed Ne gradually increases again from time t3 and reaches the up-shift start rotation speed NeTH at time t4, the up-shift is started again. Here, as shown in FIGS. 5B and 5D, in a case where the travelling mode is changed from the Ds-mode to the D-mode at time t5 before the completion of the up-shift (i.e. during the progress of the up-shift), as shown in FIG. 5C, the shift control is immediately switched at a changing point of the travelling mode (i.e. at time t5).

With this, since the shifting speed is changed to the first shifting speed Vs1 from time t5, a rate of decrease (an inclination) of the engine rotation speed Ne becomes rather gentler with time t5 being a boundary. Further, since the torque control of the Ds-AT-like control is changed to the torque control of the D-AT-like control from time t5, a control amount (a reduction amount) of the engine torque is changed, and the shift shock is suppressed.

Since the D-AT-like control is performed after time t6, at time t7 at which the engine rotation speed Ne reaches the up-shift start rotation speed NeTH, the up-shift by the first shifting speed Vs1 is started. Further, for a time period up to the time t8 at which the up-shift is completed, the engine torque is reduced by the amount of the inertia torque generated during the up-shift, and the shift shock is suppressed.

6. Effect

In view of the foregoing, according to the transmission control device according to the present embodiment, since the pseudo stepwise up-shift control is performed by the different shifting speed in the first travelling mode and the second travelling mode, an acceleration feeling can be improved.

In the transmission control device, in the case where the driver changes the travelling mode during the progress of the up-shift in the first pseudo stepwise up-shift control (i.e. the D-AT-like control) in the first travelling mode (the D-mode) whose shifting speed is slower (or lower), the first pseudo stepwise up-shift control is maintained. With this, since the shifting speed is not changed to the faster (or higher) shifting speed halfway through the up-shift, harmonization between the pseudo stepwise up-shift control and the torque control of the engine 1 can be secured, then the shift shock is surely suppressed.

Further, in the case where the driver changes the travelling mode during the progress of the up-shift in the second pseudo stepwise up-shift control (i.e. the Ds-AT-like control) in the second travelling mode (the Ds-mode) whose shifting speed is faster (or higher), the second pseudo stepwise up-shift control is switched to the first pseudo stepwise up-shift control before the up-shift is completed. With this, the shift control according to driver's intention can be achieved. In addition, in this case, since the shifting speed becomes slower (or lower) by switching the shift control, the torque control of the engine 1 can be performed in response to or according to the shifting speed. Therefore, both of the suppression of the shift shock upon the up-shift and the shift control according to the driver's intention can be achieved.

Furthermore, the first travelling mode is the normal drive mode (the D-mode), and the second travelling mode is the so-called sports mode (the Ds-mode) in which the transmission ratio is controlled so as to use the higher rotation speed side (the higher rotation speed region) of the engine 1 than that of the D-mode. Since the shifting speed of the Ds-mode is faster (or higher) than that of the D-mode, the shift shock tends to be great, as compared with the D-mode. In this respect, according to the present transmission control device, in the case where the mode is changed to the Ds-mode during the progress of the up-shift in the pseudo stepwise up-shift control (the D-AT-like control) in the D-mode, the D-AT-like control is maintained, and after the completion of the up-shift, the control is immediately switched to the Ds-AT-like control. Consequently, the shift shock upon the switch to the Ds-mode can be suppressed, and sporty run can be realized after the completion of the up-shift.

Additionally, by setting the up-shift start rotation speed NeTH, which is the condition for starting the up-shift, according to the acceleration demand in the pseudo stepwise up-shift control, it is possible to perform the up-shift with a proper timing.

7. Others

Although the present invention is explained above, the present invention includes all design modifications and equivalents belonging to the technical scope of the present invention.

In the above embodiment, in the case where the travelling mode is changed to the D-mode during the progress of the up-shift in the Ds-AT-like control, the shift control is switched to the D-AT-like control during the progress of the up-shift. However, it could be possible to switch the shift control to the D-AT-like control after waiting for the completion of the up-shift. In this case, a configuration of control logic can be simplified.

In addition, the up-shift start rotation speed NeTH could be set to a different value between the D-AT-like control and the Ds-AT-like control. That is, as shown in FIGS. 6A to 6F, in the case of the D-AT-like control, the up-shift is started when the engine rotation speed Ne reaches a first up-shift start rotation speed NeTH1, whereas in the case of the Ds-AT-like control, the up-shift is started when the engine rotation speed Ne reaches a second up-shift start rotation speed NeTH2. Here, the up-shift start rotation speed NeTH, the first up-shift start rotation speed NeTH1 and the second up-shift start rotation speed NeTH2 could be a predetermined constant value.

Further, the shift amount R during the up-shift could be a different value between the -AT-like control and the Ds-AT-like control.

Moreover, in the above embodiment, as an example, the pseudo stepwise up-shift mode is selected when the conditions 1 to 3 are all satisfied. However, the condition for performing the pseudo stepwise up-shift control is not limited to these, and it could be other conditions.

Furthermore, the travelling mode is not limited to the two of the D-mode and the Ds-mode. It could be, for instance, an eco-mode, other than the -mode and the Ds-mode.

The invention claimed is:

1. A transmission control device for a continuously variable transmission, which continuously varies a rotation speed of an engine mounted in a vehicle having a plurality of travelling modes and outputs the rotation speed, the transmission control device comprising:
   a mode changing unit operated by a driver and changing the travelling mode;
   a first control unit performing a first pseudo stepwise up-shift control that when the travelling mode is a first travelling mode and a first predetermined condition is satisfied, increases a vehicle speed while repeating hold of a transmission ratio and up-shift by a first shifting speed, and reduces a torque of the engine by an amount of an inertia torque generated during the up-shift by the first shifting speed;
   a second control unit performing a second pseudo stepwise up-shift control that when the travelling mode is a second travelling mode and a second predetermined condition is satisfied, increases the vehicle speed while repeating hold of the transmission ratio and up-shift by a second shifting speed that is faster than the first shifting speed, and reduces the torque of the engine by an amount of an inertia torque generated during the up-shift by the second shifting speed; and
   a third control unit controlling change of the travelling mode by the mode changing unit and controlling switch between the first pseudo stepwise up-shift control and the second pseudo stepwise up-shift control according to control states of the first control unit and the second control unit, and
   the third control unit being configured to, when the travelling mode is changed from the first travelling mode to the second travelling mode by the mode changing unit during a progress of the up-shift in the first pseudo stepwise up-shift control by the first control unit, maintain the first pseudo stepwise up-shift control by the first control unit until the up-shift is completed.

2. The transmission control device for the continuously variable transmission as claimed in claim 1, wherein:
   the third control unit is configured to, when the travelling mode is changed from the second travelling mode to the first travelling mode by the mode changing unit during a progress of the up-shift in the second pseudo stepwise up-shift control by the second control unit, switch the second pseudo stepwise up-shift control by the second control unit to the first pseudo stepwise up-shift control by the first control unit before the up-shift is completed.

3. The transmission control device for the continuously variable transmission as claimed in claim 1, wherein:
   the first travelling mode is a normal drive mode, and
   the second travelling mode is a mode in which the transmission ratio is controlled so as to use a higher rotation speed side of the engine than that of the normal drive mode.

4. The transmission control device for the continuously variable transmission as claimed in claim 1, wherein:
   the first control unit starts the up-shift when the rotation speed gradually increases and reaches a first up-shift start rotation speed in the first pseudo stepwise up-shift control, the second control unit starts the up-shift when the rotation speed gradually increases and reaches a second up-shift start rotation speed in the second pseudo stepwise up-shift control, and the first up-shift start rotation speed and the second up-shift start rotation speed are set according to an acceleration demand.

* * * * *